Patented Oct. 7, 1952

2,613,202

UNITED STATES PATENT OFFICE 2,613,202

METHOD FOR POLYMERIZING CHLOROTRIFLUOROETHYLENE

George F. Roedel, Schenectady, N. Y., assignor to General Electric Company, a corporation of New York No Drawing. Application June 28, 1950, Serial No. 170,940

15 Claims. (Cl. 260—92.1)

This invention is concerned with a method for making polymeric chlorotrifluoroethylene. More particularly, the invention is concerned with a process for making high molecular weight, substantially heat-stable polymeric chlorotrifluoroethylene which comprises (1) forming an aqueous suspension of a mixture of ingredients having a pH below 4.0 and comprising (a) chlorotrifluoroethylene, (b) water, (c) an organic peroxide polymerization catalyst, (d) a heavy metal compound whose metal ion is capable of existing in at least two valence states and which compound is soluble in the chlorotrifluoroethylene, e. g., a monomer-soluble iron salt, (e) a water-soluble reducing agent readily oxidized in the presence of the polymerization catalyst and the aforesaid heavy metal compound and (2) effecting reaction between the ingredients at a temperature below 35° C. while agitating the mixture of ingredients.

One of the objects of this invention is to prepare polymeric chlorotrifluoroethylene.

A further object of the invention is to obtain polymeric chlorotrifluoroethylene in good yields.

Another object of the invention is to obtain polymeric chlorotrifluoroethylene having a high softening point at least above 220° C.

A still further object of this invention is to obtain polymeric chlorotrifluoroethylene in a finely divided form which can be advantageously employed for various applications.

It has been known heretofore that polymeric chlorotrifluoroethylene could be prepared by polymerizing the monomer in bulk using various polymerization catalysts. However, such methods have the disadvantage of requiring substantially long periods of time and in addition give relatively low yields or conversions of the initial monomer. It has also been suggested that chlorotrifluoroethylene can be copolymerized with, for example, ethylene in aqueous emulsions to give polymers whose softening points are higher than the recorded softening point of about 145°–160° C. (as disclosed in U. S. Patent 2,392,378) of the chlorotrifluoroethylene homopolymer obtained by polymerization of the monomer in aqueous emulsion. However, such a low softening point for polymeric chlorotrifluoroethylene renders the product of questionable utility in view of the fact that materials can be prepared having softening points higher than the recorded softening point for the homopolymer. Moreover, emulsion polymerization of chlorotrifluoroethylene gives poor yields and low molecular weight polymers having softening points well below 200° C., while at the same time introducing contaminants in the polymer which are difficult to remove.

I have now discovered unexpectedly that by employing a particular combination of conditions of reaction I am able to obtain from the monomeric chlorotrifluoroethylene good yields of the polymer whose properties are more than satisfactory, especially polymers whose softening points are above 220° C., e. g., from 220° to 270° C. or higher, and which under pressure sinter to clear specimens at 220° to 230° C. These results are obtained by conducting the polymerization of the chlorotrifluoroethylene in the form of an aqueous suspension using a particular combination of ingredients and a particular ratio of such ingredients while maintaining the pH of the system within a fairly narrow range.

The first condition which is necessary for the practice of my invention is that the reaction be conducted in the form of an aqueous suspension. In preparing the suspension of the cholorotrifluoroethylene, the ratio of water to monomer is preferably varied within certain limits. Thus, on a weight basis I may use a ratio greater than 1 and up to 8 or more parts water per part of monomeric chlorotrifluoroethylene. The ratio of water is critical and I have found that the water should be present in a ratio greater than 1 to 1, for example, from about 2 to 6 parts of water per part of monomer. Below a ratio of 2 parts water per part monomer, the rate of conversion of the monomer to the polymer decreases rapidly. It has also been found that at a ratio of around 5 and over parts water per part monomer, stable water-wet suspensions or latices are unexpectedly obtained with conversions of the monomer to polymer above 90%. Where the water-to-monomer ratio is lower than 5 to 1, water-wet suspensions can be obtained only by stopping the reaction at the point which gives around 15 to 16% solids content. With water ratios below 5 to 1 and where the solids content exceeds about 16%, the polymer is obtained as a non-water-wet powder. It will, of course, be apparent that although larger amounts of water may be used, excess amounts of water may not be advantageous under some circumstances since it will require larger reaction vessels and greater handling than where the water-to-monomer ratio is within the range described above. This, however, does not mean that ratios of water to monomer in excess of, for example, 2 to 1, for instance, 6 to 1, or more, may not be used, and I do not intend to be limited in this respect to upper ranges of water-to-monomer ratios.

As another condition for effecting the polymerization of chlorotrifluoroethylene, it has been found essential that the pH of the system be maintained within fairly narrow limits. I have found that a pH of from about 2.3 to 4.0, preferably from about 2.5 to 3.5 is eminently suitable. Within the above described pH ranges, I have found that conversions ranging from about 75 to 95% of the monomer to polymer are feasible. When a pH below or above this range is employed under equivalent conditions, the tendency is toward lower conversion rates as indicated by the fact that when a pH of about 2.0 is employed, the per cent conversion is around 20% and when a pH of above 4.0 is used the conversion drops to below 50%.

It has been found that in the presence of water, chlorotrifluoroethylene reacts rapidly with oxygen or air to produce six mols of hydrogen ion for each mol of oxygen present. Thus, it is obvious, in order to maintain the pH range described above, that oxygen must be excluded almost completely from the reaction during the course of the polymerization. This can be accomplished by degassing both the water and monomer by conventional means and charging them to an evacuated reaction vessel while excluding air in the transfer. For example, the inclusion of only a few mm. of air pressure or oxygen is sufficient to effect a change in pH beyond the effective pH range for the reaction.

I have found it desirable to use during the polymerization, accelerator organic catalysts especially of the peroxide type, capable of acting as a source of free radicals. Among such catalysts may be mentioned, for example, the various diacyl, acyl alkyl, etc., peroxide catalysts. Specific examples of such catalysts are, for instance, benzoyl peroxide, tertiary butyl perbenzoate, lauroyl peroxide, di-(t-butyl) dipersuccinate, dichlorobenzoyl peroxide, di-(t-butyl) diperphthalate, etc. Unexpectedly, it was found that hydroperoxides and dialkyl peroxides were less effective than the classes of catalysts described above. The amount of catalyst employed is preferably varied within certain ranges in order to obtain optimum conversion of the monomer to the polymeric product and influence the molecular weight. I have found that the percentage catalyst which can be used is advantageously within the range of from about 0.005 to 2%, by weight, more particularly from about 0.01 to 0.5%, by weight, based on the weight of the monomer. Catalyst concentrations ranging from about 0.04 to 0.10 percent give yields of polymer equal to about 92 to 94% of the monomer charged to the reaction mixture in about 9 hours.

In conducting my reaction for effecting polymerization of the chlorotrifluoroethylene, it has been found essential to employ what is known as a "redox system" comprising (a) a heavy metal compound which has solubility in the chlorothrifluoroethylene, the heavy metal ion of which is capable of existing in two valence states, e. g., salts of iron, cobalt, nickel, manganese, copper, zinc, silver, etc., and (b) a compound capable of converting the heavy metal ion to a lower valence state. I prefer to use heavy metal compounds in which the heavy metal ion is in group VIII, namely, cobalt, iron, and nickel, particularly iron compounds. The omission of either or both members of this redox system in my invention unexpectedly results in scarcely any yield of polymer which is most unobvious.

The heavy metal compounds can be employed either in the higher or lower valence state. Thus, referring specifically to iron salts, the compound of iron used may have the iron in either the ferrous or ferric oxidation state. By means of the reducing agent, a dynamic equilibrium is set up whereby the ferric ion is reduced to the ferrous state. The ferrous ion then reacts with the polymerization initiator to liberate free radicals from the initiator at lower temperatures than would ordinarily be possible.

In this process of reaction, the ferrous ion in turn is oxidized to the ferric state by its reaction with the polymerization initiator. It is able to react with the reducing agent to again convert it to the ferrous state where it is once more available for reaction with the polymerization initiator. In order to effect the reaction of the ferrous ion with the polymerization initiator while it is in the oil or monomer phase, it is necessary to use a compound which can combine with the heavy metal ion to effect solubilization of the heavy metal ion in the monomer.

Such monomer-soluble heavy metal compounds may be introduced in the preformed state or may be formed in situ in the reaction mass. Among the preformed monomer-soluble heavy metal compounds which I may use are, e. g., iron benzoate, iron citrate, iron stearate, cobalt citrate, nickel citrate, nickel benzoate, copper citrate, chelates of heavy metal ions, etc. It will, of course, be apparent to those skilled in the art that salts of other of the heavy metal compounds mentioned above in conjunction with other monomer-solubilizing agents, e. g., citric acid, fatty acids, 1,3-diketo compounds, etc., may also be employed without departing from the scope of the invention.

Instead of using a preformed monomer-soluble heavy metal compound, one may employ an originally monomer-insoluble heavy metal compound or salt and effect solubilization by the addition of a suitable agent or solubilizing compound capable of combining with the heavy metal ion to form a monomer-soluble complex or monomer-soluble salt. Among such solubilizing agents may be mentioned, for example, benzoic acid, sodium benzoate, citric acid, various chelates, e. g., acetyl acetone, etc.; salicylaldehyde, stearic acid, etc. The amount of solubilizing agent may be varied within fairly wide limits, by weight of the heavy metal compound, and is preferably present in a molecular equivalent with the heavy metal compound.

The heavy metal compounds originally insoluble in the monomer may comprise any one of many used in well-known redox systems for the stipulated purpose. Among these may be mentioned, for example, iron phosphates including ferric and ferrous phosphates; ferrous ammonium sulfate, ferrous sulfate, ferric chloride, ferric citrate, ferric tartrate, ferric laurate, ferric pyrophosphate, ferrous thiosulfate, ferrous thiocyanate, cobaltic chloride, cobaltic sulfate, cobaltous ammonium sulfate, cobaltous sulfate, nickel chloride, nickel phosphate, nickel sulfate, etc. These heavy metal compounds or salts are preferably present in small amounts of the order of from about 0.01 to 0.50%, by weight, based on the weight of the monomeric chlorotrifluoroethylene. An optimum range for best yield of the polymer has been found in some instances to lie between about 0.04 to 0.12% of the iron salt based on the weight of the monomer.

As a second of the components of the "redox system," there is employed a reducing agent which is readily oxidized in the presence of the polymerization catalyst and heavy metal compound, e. g., the iron salt or iron promoter. Various reducing agents may be employed as, for example, sodium bisulfite, potassium bisulfite, sodium hydrosulfite; other oxidizable sulfoxy and sulfur containing compounds, e. g., sulfurous acid, sulfites, hydrosulfites, thiosulfates, sulfides sulfoxalates etc. The amount of the reducing agent may be varied, for instance, from about 0.005 to 1%, by weight, or more based on the weight of water and is not critical though it is preferably present in an amount ranging from about 0.01 to 0.5%, by weight. Further examples of heavy metal compounds and reducing agents which may be employed in the redox system may be found, for instance, in U. S. Patents 2,380,473-477.

Throughout the reaction agitation is preferably employed. It has been found that if agitation of the reaction mixture is omitted during the course of polymerization, there is a considerable slow-down in the rate of reaction.

Since the monomeric chlorotrifluoroethylene is a gas at normal temperatures and pressures, it is advantageous to conduct the reaction in a closed vessel under superatmospheric pressure. I have found it satisfactory to operate the reaction under the autogenous pressure of the reactants in a closed vessel. As will be apparent to persons skilled in the art, the temperature of polymerization will determine the pressure of the system. Using the preferred temperature ranges it will be found that the pressures employed will range from about 20-115 p. s. i. which is much lower than has heretofore been employed in the polymerization of the same or similar monomers. However, I do not intend to be limited to these particular pressures since as far as can be determined they are not particularly critical and under many conditions of reaction higher or lower pressures may be employed without departing from the scope of the invention.

One of the most important advantages of my claimed process for preparing polymeric chlorotrifluoroethylene resides in the fact that relatively low temperatures can be employed as compared to other processes involved in the polymerization of similar or different monomers which may require relatively higher temperatures. Thus, I may use temperatures ranging, for example, from about 0° to 35° or 40° C., preferably from about 0° to 30° C., in which range the most advantageous utilization of the combination of ingredients and conditions is realized. At temperatures above 40° or 45° C., the catalyst decomposes too rapidly and tends to give low molecular weight polymers having low softening points.

The time within which the reaction may be consummated can, of course, be varied within wide limits depending, for example, on the concentration of water to monomer ratio, impurities and contaminations of the reaction mass (which should be kept to a minimum), rate of agitation, redox system used, concentration of heavy metal ion or compound, temperature employed, etc. Generally, times of the order of from about 5 to 50 or 60 hours, for example, from about 8 to 15 hours, are sufficient within which to complete the reaction.

In order that those skilled in the art may better understand how the present invention may be practiced, the following examples are given by way of illustration and not by way of limitation. All parts are by weight. In each of the examples, the reaction was conducted in the substantial absence of oxygen by degassing and using a vacuum.

EXAMPLE 1

This example illustrates the effect of varying the water-to-monomer ratio. Pyrex reaction vessels were charged with aqueous systems containing, by weight, the following ingredients:

Table I

|  |  | Sample A | Sample B | Sample C |
|---|---|---|---|---|
| Chlorotrifluoroethylene | parts | 125 | 125 | 125 |
| Distilled Water | do | 125 | 250 | 375 |
| t-Butyl Perbenzoate | do | 0.125 | 0.125 | 0.125 |
| $NaHSO_3$ | do | 0.075 | 0.075 | 0.075 |
| Soluble Iron Phosphate [1] | do | 0.075 | 0.075 | 0.075 |
| Percent Yield |  | 50 | 90 | 94 |

[1] This comprises iron phosphate containing a small amount of citrate ion to effect solubilization of the iron phosphate in the chlorotrifluoroethylene.

Each mixture of ingredients was charged to the Pyrex reaction vessel, frozen and evacuated to remove air and oxygen, the reaction vessel closed and agitated by rocking for 24 hours at around 25° C. At the end of this time, the polymer was removed and weighed to determine the per cent conversion of the monomer to the polymer with the result shown in the above Table I. Each of the polymers had high softening points well above 200° C.

EXAMPLE 2

This example illustrates the effect of varying the pH of the system. More particularly, a mixture of ingredients comprising 250 parts water, 125 parts chlorotrifluoroethylene, 0.3 part soluble iron phosphate, 0.3 part sodium bisulfite ($NaHSO_3$), and 0.125 part tertiary butyl perbenzoate was charged to a reaction vessel similar to that employed in Example 1 and the pH of this system was adjusted by adding standard solutions of either potassium hydroxide or hydrogen chloride. The following table shows the results of polymerizing the chlorotrifluoroethylene under the various pH's for 15 hours at 25° C.

Table II

| Initial pH | Perce Yield |
|---|---|
| 5.69 | 43.4 |
| 3.46 | 85.7 |
| 3.30 | 85.0 |
| 3.12 | 88.4 |
| 2.98 | 88.5 |
| 2.75 | 82.2 |
| 2.3 | 68.0 |
| 2.0 | 20.0 |
| 1.6 | 9.0 |

EXAMPLE 3

In this example, 125 parts chlorotrifluoroethylene, 250 parts water, 0.2 part sodium bisulfite, 0.125 part tertiary butyl perbenzoate, 0.02 part ferric benzoate [$Fe(C_6H_5CO_2)_3$] and 0.025 part potassium hydroxide to effect a pH around 3.0, were mixed together in a Pyrex reaction vessel, the latter closed and caused to react under autogenous pressure for 10 hours at 250° C. At the end of this time it was found there was an 84 per cent conversion to the polymer in the reaction vessel. When the pH of the system was raised or lowered by the addition of more or less potassium hydroxide, as, for example, the addition of either 0.0280 or 0.0224 part KOH in place of the 0.025 part KOH used above, it was found that the per cent conversion in the first case (0.028 part KOH) was about 11.4% and in the second case (0.0224 part KOH) was about 66.0%, thus indicating the critical effect of varying the pH in a system employing ferric benzoate. However, if adequate control is maintained, this system produces polymers possessing very desirable characteristics with regard to high molecular weight and clearness of the molded polymer.

Instead of adding the solubilizing organic acid in the form of an iron salt thereof, it may be introduced separately and formed in situ. More particularly, using iron sulfate as an example, the latter may be caused to react with, for example, benzoic acid to give the iron benzoate. However, care must be taken to make sure that any acid, for example, sulfuric or phosphoric acid (when using iron phosphate) formed as a result of such reaction is neutralized by means of some suitable neutralizing agent so that the pH is maintained within the ranges described previously.

EXAMPLE 4

This example illustrates the effect of varying the concentration of the heavy metal compound, specifically an iron compound. More particularly, a mixture of ingredients comprising 7500 parts chlorotrifluoroethylene, 15,000 parts water, 3 parts tertiary butyl perbenzoate, and a mixture of soluble iron phosphate (containing a small amount of citrate ion) and sodium bisulfite in the weight ratio of 1 to 4, was reacted under pressure in a vessel similar to that employed in Example 1 for 16 hours at 25° C. In each case of the following five sample tests, the amount of soluble iron phosphate varied so that the soluble iron phosphate was equal to from about 0.6 to 18 parts, by weight, with the sodium bisulfite varied accordingly in the 1 to 4 ratio described above. The following Table III shows the effect of the variation of the soluble iron phosphate concentration:

*Table III*

| Parts FePO$_4$/ 7500 parts Chlorotri-fluoroethylene | Percent By Weight of Monomer | Percent Conversion |
|---|---|---|
| 0.6 | 0.008 | 22 |
| 3.0 | 0.04 | 85 |
| 6.0 | 0.08 | 81 |
| 9.0 | 0.12 | 78 |
| 18.0 | 0.24 | 65 |

From the foregoing table it is apparent that an optimum value of 3 parts soluble iron phosphate (about 0.04%, by weight) and 12 parts sodium sulfite per 7500 parts monomer, gave the best yield of polymer.

EXAMPLE 5

In this example the effect of varying the ratio of soluble iron phosphate to sodium bisulfite is illustrated by the tests conducted below. More particularly, 250 parts distilled water, 125 parts chlorotrifluoroethylene, 0.05 part tertiary butyl perbenzoate were mixed with the following corresponding per cents, by weight (based on monomer), of soluble iron phosphate and sodium bisulfite illustrated below in Table IV, and the mixtures caused to react at 25° C. with agitation for about 16 hours. The results of such variation in the ratio of the redox system is shown in the table below:

*Table IV*

| Percent Soluble Iron Phosphate | Percent NaHSO$_3$ | Ratio | Percent Conversion |
|---|---|---|---|
| 0.0125 | 0.0024 | 1 to 0.2 | 7.0 |
| 0.0125 | 0.0060 | 1 to 0.5 | 22.0 |
| 0.0125 | 0.0125 | 1 to 1 | 74.0 |
| 0.0125 | 0.025 | 1 to 2 | 77.0 |
| 0.0125 | 0.06 | 1 to 5 | 76.0 |

EXAMPLE 6

This example shows the effect of using a mixture of ingredients employing optimum concentrations and including a water-to-monomer ratio which is adequate to cause the polymer to be formed as a latex. The following ingredients were charged to a pressure reaction vessel:

| | |
|---|---|
| Chlorotrifluoroethylene | 7.5 parts |
| Water | 54.5 parts |
| Soluble iron phosphate | 0.003 part |
| Sodium bisulfite | 0.012 part |
| Tertiary butyl perbenzoate | 0.0045 part (0.06%) |
| Hydrogen chloride | 0.00182 (to a pH of 3.0) |

This system was heated with agitation at 25° C. for about 9 hours. At the end of this time it was found that the conversion had reached 90% polymer based on the charge of monomer. The polymer had a softening point of 225° C.

It has been found that in some cases lower concentrations of peroxide or polymerization accelerator can be employed with a corresponding improvement in the properties of the polymer obtained. It has also been found that by the incremental addition of the polymerization catalyst or initiator, for example, tertiary butyl perbenzoate, it is possible to effect good conversion of the monomer and also obtain improved polymers of greatly increased molecular weight. The following Example 7 illustrates the effect of lowering the peroxide concentration. As will be shown in these examples, greater conversion was obtained with larger amounts of catalyst. However, the use of larger amounts of catalyst resulted in somewhat lower molecular weight products, whereas the reduction of the amount of catalyst employed gave considerably higher molecular weight products but also resulted in a slower conversion of the monomer to the polymer. This can be overcome in some cases by the incremental addition of the catalyst.

To evaluate the quality of the polymer as evidenced by its molecular weight, the specific viscosity of the polymer was obtained by measuring the flow time of a solution of the polymer in dichlorobenzotrifluoride at 140° C. The specific viscosity $\eta_{sp}$ is defined as follows:

$$\eta_{sp} = \frac{t_s - t_0}{t_0} \bigg/ c = \frac{t_s}{t_0} - 1 \bigg/ c$$

where $t_s$ is flow time of the solution in seconds, $t_0$ is the flow time of the solvent, and $c$ equals the concentration in grams/100 ml. of solvent. By knowing the specific viscosity, it is possible to correlate this with the no strength temperature of the polymer. The no strength temperature is defined as the temperature in °C. at which a molded piece of polymeric chlorotrifluoroethylene having a cross sectional area of $\frac{1}{16}''$ square will fall apart from its own weight and can be used as a measure of molecular weight. The relationship of the specific viscosity to no strength temperature is shown in the following table:

*Table V*

| No Strength Temperature, °C. | $\eta_{sp}$ |
|---|---|
| 240 | 0.8–1.0 |
| 270 | 1.35–1.5 |
| 300 | 1.5–1.9 |

EXAMPLE 7

In this example several samples of the formulation found in sample B of Example 1 were prepared with the exception that the catalyst, tertiary butyl perbenzoate, was employed in varying per cents thereof based on the weight of the monomer. The formulations were allowed to react at 25° C. for 16 hours with agitation, at the end of which time the per cent conversion of the monomer to polymer and the quality of the polymer were determined. The following Table VI illustrates the effect of varying the percentage of catalyst, specifically the percentage (by weight of the monomer) of tertiary butyl perbenzoate.

*Table VI*

| Percent Tertiary Butyl Perbenzoate | Percent Conversion | $\eta_{sp}$ |
|---|---|---|
| 0.10 | 92.8 | 0.668 |
| 0.08 | 94.6 | 0.680 |
| 0.06 | 89.6 | 0.700 |
| 0.05 | 76.0 | 0.845 |
| 0.04 | 64.3 | 0.970 |
| 0.02 | 37.2 | 0.888 |

EXAMPLE 8

The effect of varying the polymerization temperature is described in this example. More particularly, a mixture of ingredients comprising 75 parts chlorotrifluoro ethylene, 545 parts water, 0.03 part sodium bisulfite, 0.12 part soluble iron phosphate and tertiary butyl perbenzoate in the percentages described in the following Table VII were charged to a pressure reactor and the mixture of ingredients caused to react with agitation at the temperatures and for the times disclosed in the aforementioned Table VII. At the end of the stipulated time the per cent conversion of the monomer to the polymer was determined as well as the specific viscosity $\eta_{sp}$.

*Table VII*

0.05% CATALYST

| T, °C. | Time, Hrs. | Percent Conversion | $\eta_{sp}$ |
|---|---|---|---|
| 25 | 9 | 90.0 | 0.90 |
| 5 | 40 | 85.5 | 1.38 |
| 0 | 60 | 85.7 | 1.50 |

0.04% PEROXIDE

| 25 | 16 | 64 | 0.970 |
| 5 | 39 | 98 | 1.456 |

0.02% PEROXIDE

| 25 | 16 | 37 | 0.88 |
| 5 | 40 | 61 | 1.67 |
| 0 | 62 | 61.5 | 1.97 |

It will be noted that the temperature at which the reaction is conducted is a controlling factor in the molecular weight of the product.

EXAMPLE 9

Ferric benzoate was disclosed previously as being highly effective in the system for polymerizing chlorotrifluoroethylene. However, it has been found sensitive to pH effects as illustrated in this example, and for this reason pH control should be carefully exercised within the range described previously. A mixture of ingredients comprising 12.5 grams chlorotrifluoroethylene, 25 grams water, 0.02 gram sodium bisulfite, 0.002 gram ferric benzoate [$Fe(C_6H_5CO_2)_3$], and 0.012 gram tertiary butyl perbenzoate were charged to a pressure reactor and the mixture of ingredients was caused to react 10 hours at 25° C. under a variety of conditions in which the pH of the system was varied by the introduction of small amounts of 0.01 N KOH. The following Table VIII shows the per cent conversion of the monomer to the polymer as a result of the variation of the KOH.

*Table VIII*

| ml. 0.01 N KOH | Percent Conversion |
|---|---|
| 6.5 | 0 |
| 6.0 | 0 |
| 5.5 | 0 |
| 5.0 | 11 |
| 4.5 | 85 |
| 4.0 | 66 |

EXAMPLE 10

As pointed out previously the heavy metal compound constituting part of the redox system must be soluble in the monomer. This can be effected either by using an originally monomer-soluble heavy metal compound or forming a monomer-soluble heavy metal compound in situ by complexing an originally monomer-insoluble heavy metal compound with a solubilizing agent, for example, citric acid, etc. This example illustrates the effect of using both originally monomer-soluble heavy metal compounds and originally monomer-insoluble heavy metal compounds in the polymerization of chlorotrifluoroethylene. More particularly, a mixture of ingredients comprising 25 parts water, 12.5 parts chlorotrifluoroethylene, 0.02 part sodium bisulfite, 0.0125 part tertiary butyl perbenzoate, and an amount of an iron salt disclosed in the table below equivalent to 0.005 part soluble iron phosphate, were charged to a pressure reaction vessel, the vessel closed and heated with agitation under autogenous pressure for about 16 hours at around 25° C. At the end of this time the vessel was opened and the per cent conversion of the monomer to polymer was determined in each case. In the following table the results of these per cents conversion are disclosed for the respective heavy metal compounds employed in the reaction. It will be apparent from the table that where an originally monomer-insoluble heavy metal compound was employed the per cent conversion was low. However, when an originally monomer-soluble heavy metal compound was employed or where the monomer-insoluble heavy metal compound was modified by the addition of a solubilizing agent, for example, citric acid, the conversion of the monomer to polymer was high.

Table IX

| Iron Compound | Percent Conversion |
|---|---|
| Soluble Iron Phosphate | 90 |
| $Fe_2(SO_4)_3(NH_4)_2SO_4.24H_2O$ | 18 |
| $FeSO_4(NH_4)_2SO_4.6H_2O$ | 10 |
| $FeSO_4.7H_2O$ | 15 |
| $FeSO_4.7H_2O+0.002$ part citric acid | 87.5 |
| $Fe_2(SO_4)_3$ | 32 |
| $Fe_2(SO_4)_3+0.002$ part citric acid | 70 |
| Fe(Stearate)$_3$ | 83 |
| Fe(benzoate)$_3$ | 89 |
| $Fe^{2+}$(acetyl acetonate)$_2$ | 57 |
| $Fe^{3+}$(acetyl acetonate)$_3$ | 78 |

EXAMPLE 11

This example illustrates three runs in which large amounts of ingredients were employed simulating production conditions. The ingredients described in Table X were charged to a 30 gallon glass-lined Pfaudler autoclave equipped with an anchor stirrer revolving at 150 R. P. M. and having a key baffle. The time and conditions of reaction, as well as the per cent conversion and specific viscosity of the polymer, are shown in the table below:

Table X

| | Sample No. 1 | Sample No. 2 | Sample No. 3 |
|---|---|---|---|
| Chlorotrifluoroethylene kg | 10.98 | 10.98 | 13.55 |
| $H_2O$ kg | 80.00 | 80.00 | 98.40 |
| $NaHSO_3$ kg | 0.01755 | 0.01755 | 0.0217 |
| Soluble iron phosphate kg | 0.00438 | 0.00438 | 0.00542 |
| t-butyl perbenzoate kg | 0.01098 | 0.00625 | 0.00408 |
| HCl kg | 0.00262 | 0.00262 | 0.00328 |
| Time hours | 9 | 16½ | 48 |
| Temperature degrees | 25 | 25 | 0 |
| Per Cent Conversion | 90 | 90 | 90 |
| Specific Viscosity | 0.59 | 0.702 | 1.50 |

From the foregoing it will be apparent that I have discovered a method for making polymeric chlorotrifluoroethylene easily and rapidly, and using relatively low pressures of the order of from about 30 to 115 p. s. i. The conversion to polymer is high and the product obtained has outstanding properties. The fact that my combination of ingredients and conditions was able to produce the results described could in no way have been predicted since the omission of any of the ingredients or conditions in my system gave substantially poorer conversions of the monomer to polymer.

It will, of course, be apparent to those skilled in the art that other conditions of reaction as well as different modifying ingredients other than those used in the foregoing examples may be employed without departing from the scope of the invention. Many examples of such modifying ingredients as, for example, catalysts, members of the redox system and monomer-to-water ratios which may be employed, etc., have been given previously. The polymers obtained in accordance with my claimed process are tough and have high softening points. In addition, many of the polymers do not soften to a rubbery solid under a pressure of 75 p. s. i. up to temperatures of about 225°–235° C. and are quite stable. They do not decompose to evolve gas visibly below 300° C.

The polymers prepared herein find a large number of valuable applications. Because of their substantial inertness, they are eminently suitable for applications requiring resistance to various chemical reactants. In addition, because of their heat stability at elevated temperatures, they are advantageously employed as gaskets and valve packings where other materials cannot withstand the corrosive attack or elevated temperatures. Electrical conductors of all sorts, such as wires, motor armatures and cables can be insulated with polymeric chlorotrifluoroethylene, such insulated conductors being particularly useful because of the inertness of the insulating polymers.

Polymeric chlorotrifluoroethylene has been found to be highly suitable as insulation for electrical conductors in which the surface beneath and immediately adjacent the polymer is an aluminum type surface. Electrical conductors of this type are more particularly disclosed and claimed in the copending application of Edward J. Flynn and Gerald W. Young, Serial No. 54,636, filed October 15, 1948, and assigned to the same assignee as the present invention.

If desired, dispersions of the polymer or solutions thereof may be used to coat and impregnate various fillers such as asbestos, glass fibers, aluminum powders, or sheets or hard surfaces of various materials as, for example, metal molds, glass cloth, asbestos cloth, etc. Such treated sheet materials may be molded under heat and pressure to obtain useful objects. In the case of the treated sheets, the latter may be superposed on each other and molded to give laminated panels having outstanding heat resistance and good electrical properties.

What I claim as new and desire to secure by Letters Patent of the United States is:

1. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) an organic peroxide polymerization catalyst for (a), (d) a heavy metal compound whose metal ion is capable of existing in at least two valence states and which compound is soluble in the chlorotrifluoroethylene, and (e) a water-soluble reducing agent for the heavy metal ion, and (2) effecting reaction under autogenous pressure between the ingredients at a pH of from about 2.3 to 4.0 at a temperature below 35° C. for a time sufficient to effect polymerization of the monomer to polymeric chlorotrifluoroethylene.

2. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) an organic peroxide polymerization catalyst for (a), (d) a soluble iron phosphate which is soluble in the chlorotrifluoroethylene, and (e) a water-soluble reducing agent for the iron ion, and (2) effecting reaction under autogenous pressure between the ingredients at a pH of from about 2.3 to 4.0 at a temperature below 35° C. for a time sufficient to effect polymerization of the monomer to polymeric chlorotrifluoroethylene.

3. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) an organic peroxide polymerization catalyst for (a), (d) an iron benzoate which is soluble in the chlorotrifluoroethylene, and (e) a water-soluble reducing agent for the iron ion, and (2) effecting reaction under autogenous pressure between the ingredients at a pH of from about 2.3 to 4.0 at a temperature below 35° C. for a time sufficient to effect polymerization of the monomer to polymeric chlorotrifluoroethylene.

4. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) an organic peroxide polymerization catalyst for (a), (d) a mixture of iron sulfate and citric acid which is soluble in the chlorotrifluoroethylene, and (e) a water-soluble reducing agent for the iron ion, and (2) effecting reaction under autogenous pressure between the ingredients at a pH of from about 2.3 to 4.0 at a temperature below 35° C. for a time sufficient to effect polymerization of the monomer to polymeric chlorotrifluoroethylene.

5. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) an organic peroxide polymerization catalyst for (a), (d) an iron stearate which is soluble in the chlorotrifluoroethylene, and (e) a water-soluble reducing agent for the iron ion, and (2) effecting reaction under autogenous pressure between the ingredients at a pH of from about 2.3 to 4.0 at a temperature below 35° C. for a time sufficient to effect polymerization of the monomer to polymeric chlorotrifluoroethylene.

6. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) an organic peroxide polymerization catalyst for (a), (d) a heavy metal compound whose metal ion is capable of existing in at least two valence states and which compound is soluble in the chlorotrifluoroethylene, and (e) a water-soluble reducing agent for the heavy metal ion comprising sodium bisulfite, and (2) effecting reaction under autogenous pressure between the ingredients at a pH of from about 2.3 to 4.0 at a temperature below 35° C. for a time sufficient to effect polymerization of the monomer to polymeric chlorotrifluoroethylene.

7. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) an organic peroxide polymerization catalyst for (a), (d) a soluble iron phosphate which is soluble in the chlorotrifluoroethylene, and (e) a water-soluble reducing agent for (d) comprising sodium bisulfite, and (2) effecting reaction under autogenous pressure between the ingredients at a pH of from about 2.5 to 3.5 at a temperature below 35° C. for a time sufficient to effect polymerization of the monomer to polymeric chlorotrifluoroethylene.

8. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) an organic peroxide polymerization catalyst for (a), (d) an iron benzoate which is soluble in the chlorotrifluoroethylene, and (e) a water-soluble reducing agent for (d) comprising sodium bisulfite, and (2) effecting reaction under autogenous pressure between the ingredients at a pH of from about 2.5 to 3.5 at a temperature below 35° C., for a time sufficient to effect polymerization of the monomer to polymeric chlorotrifluoroethylene.

9. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) an organic peroxide polymerization catalyst for (a), (d) a mixture of iron sulfate and citric acid which is soluble in the chlorotrifluoroethylene, and (e) a water-soluble reducing agent for (d) comprising sodium bisulfite, and (2) effecting reaction under autogenous pressure between the ingredients at a pH of from about 2.5 to 3.5 at a temperature below 35° C. for a time sufficient to effect polymerization of the monomer to polymeric chlorotrifluoroethylene.

10. The process for obtaining polymeric chlorotrifluoroethylene having a softening point above 220° C., which process comprises (1) forming a suspension of ingredients comprising (a) chlorofluoroethylene, (b) water, the ratio of water to monomer on a weight basis being about 1 to 1, (c) an organic peroxide polymerization catalyst for (a), (d) an iron stearate which is soluble in the chlorotrifluoroethylene, and (e) a water-soluble reducing agent for (d) comprising sodium bisulfite, and (2) effecting reaction under autogeneous pressure between the ingredients at a pH of from about 2.5 to 3.5 at a temperature below 35° C. for a time sufficient to effect polymerization of the monomer to polymeric chlorotrifluoroethylene.

11. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) tertiary butyl perbenzoate, (d) a soluble iron phosphate which is soluble in the chlorotrifluoroethylene, and (e) a water-soluble reducing agent for (d) comprising sodium bisulfite, and (2) effecting reaction under autogenous pressure between the ingredients at a pH of from about 2.5 to 3.5 at a temperature of from about 0° to 30° C., for a time sufficient to effect polymerization of the monomer to polymeric chlorotrifluoroethylene.

12. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) tertiary butyl perbenzoate, (d) an iron benzoate which is soluble in the chlorotrifluoroethylene, and (e) a water-soluble reducing agent for (d) comprising sodium bisulfite, and (2) effecting reaction under autogenous pressure between the ingredients at a pH of from about 2.5 to 3.5 at a temperature of from about 0° to 30° C., for a time sufficient to effect polymerization of the monomer to polymeric chlorotrifluoroethylene.

13. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) tertiary butyl perbenzoate, (d) a mixture of iron sulfate and citric acid which is soluble in the chlorotrifluoroethylene, and (e) a water-soluble reducing agent for (d) comprising sodium bisulfite, and (2) effecting reaction under autogenous pressure between the ingredients at a pH of from about 2.5 to 3.5 at a temperature of from about 0° to 30° C., for a time sufficient to effect polymerization of the monomer to polymeric chlorotrifluoroethylene.

14. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 1 to 1, (c) tertiary butyl perbenzoate, (d) an iron stearate which is soluble in the chlorotrifluoroethylene, and (e) a water-soluble reducing agent for (d) comprising sodium bisulfite, and (2) effecting reaction under autogenous pressure between the ingredients at a pH of from about 2.5 to 3.5 at a temperature of from about 0° to 30° C., for a time sufficient to effect polymerization of the monomer to polymeric chlorotrifluoroethylene.

15. The process for obtaining polymeric chlorotrifluoroethylene having a softening point above 220° C., which process comprises (1) forming a suspension of ingredients comprising (a) chlorotrifluoroethylene, (b) water, the ratio of water to monomer on a weight basis being above 2 to 1, (c) from 0.01 to 0.5%, by weight, tertiary butyl perbenzoate, (d) a soluble iron phosphate which is soluble in the chlorotrifluoroethylene and which is present, by weight, in an amount equal to from 0.01 to 0.5%, the weight of (c) and (d) each being based on the weight of the monomeric chlorotrifluoroethylene, and (e) sodium bisulfite equal to from 0.01 to 0.5% of the weight of the water, and (2) effecting reaction under autogenous pressure between the ingredients at a pH of about 2.5 to 3.5 at a temperature of from about 0° to 30° C., for a time sufficient to effect polymerization of the monomer to the polymeric chlorotrifluoroethylene.

GEORGE F. ROEDEL.

REFERENCES CITED

The following references are of record in the file of this patent:

UNITED STATES PATENTS

| Number | Name | Date |
|---|---|---|
| 2,456,255 | Coffman et al. | Dec. 14, 1938 |
| 2,473,549 | Smith | June 21, 1949 |
| 2,569,524 | Hamilton | Oct. 2, 1951 |

FOREIGN PATENTS

| Number | Country | Date |
|---|---|---|
| 796,026 | France | Mar. 27, 1936 |